United States Patent [19]

Battiston

[11] Patent Number: 4,619,282

[45] Date of Patent: Oct. 28, 1986

[54] CLAMPS FOR INVALID WALKER TO ENHANCE STRUCTURAL INTEGRITY

[75] Inventor: Joseph Battiston, Clifton, N.J.

[73] Assignee: Tubular Fabricators Industry, Inc., Passaic, N.J.

[21] Appl. No.: 661,260

[22] Filed: Oct. 16, 1984

[51] Int. Cl.$^4$ .......................... A61H 3/00; F16L 41/08
[52] U.S. Cl. ................................ 135/67; 135/DIG. 9; 403/235; 403/399
[58] Field of Search .......................... 135/67, DIG. 9; 403/391, 389, 396, 399; 248/225.3, 214, 219.1, 225.3 R, 226.3, 228; 292/305; 24/2.5, 19, 457, 458, 486, 336, 339, 545, 530; 297/5, 6; 182/228

[56] References Cited

U.S. PATENT DOCUMENTS

| | | | |
|---|---|---|---|
| 118,868 | 9/1871 | McClelland | 24/279 |
| 340,338 | 4/1886 | Marshall | 182/228 X |
| 367,974 | 8/1887 | Hanson | 256/21 X |
| 732,309 | 6/1903 | Marshall | 24/280 |
| 978,398 | 12/1910 | Rischard | 24/19 X |
| 1,261,678 | 4/1918 | Barnes et al. | 24/339 X |
| 1,792,489 | 2/1931 | Gilmore | 135/DIG. 9 |
| 1,943,020 | 1/1934 | Johnson | 403/391 X |
| 2,351,858 | 6/1944 | Ingalls | 403/389 X |
| 2,452,406 | 10/1948 | Volkery et al. | 403/391 |
| 2,599,882 | 6/1952 | Adams | 24/279 |
| 2,732,004 | 1/1956 | Forbes | 272/70.4 |
| 2,834,086 | 5/1958 | Smith et al. | 24/279 |
| 3,106,931 | 10/1963 | Cooper | 135/108 X |
| 3,199,521 | 8/1965 | Ries | 135/67 |
| 3,387,617 | 6/1968 | Reiber | 135/67 |
| 3,829,908 | 8/1974 | Thomas | 135/75 X |
| 3,993,349 | 11/1976 | Neufeld et al. | 297/6 |
| 4,006,288 | 2/1977 | Stevens | 24/279 |
| 4,059,872 | 11/1977 | Delasandri | 24/279 |
| 4,121,798 | 10/1978 | Schumacher et al. | 24/336 X |
| 4,135,535 | 1/1979 | Thomas | 135/67 |
| 4,411,283 | 10/1983 | Lucarelli | 135/67 |

FOREIGN PATENT DOCUMENTS

| | | | |
|---|---|---|---|
| 1105324 | 6/1955 | France | 135/67 |
| 6714462 | 5/1968 | Netherlands | 24/339 |

*Primary Examiner*—Robert A. Hafer
*Assistant Examiner*—Arnold W. Kramer
*Attorney, Agent, or Firm*—David A. Jackson

[57] ABSTRACT

An invalid device comprises four vertically disposed support legs, each support leg including a pair of adjustable inner and outer telescoping leg portions; at least one cross member extending between the vertically disposed support legs; and at least one clamp for connecting each end of the cross members to the vertically disposed support legs, each clamp including a first section having a bore extending entirely therethrough for receiving the outer telescoping leg portion of a support leg and a slit extending therealong for connecting the exterior of the first section with the bore, two flange members connected along the first section on opposite sides of the slit for receiving at least one cross member, and each flange member including a through aperture such that a bolt, rivet or the like extending through the cross member and the through apertures will bias the flange members toward each other so as to fixedly retain the at least one cross member between the flange members and so as to compress the first section about the outer telescoping leg portion of the support leg to fixedly retain the latter within the bore.

16 Claims, 10 Drawing Figures

CLAMPS FOR INVALID WALKER TO ENHANCE STRUCTURAL INTEGRITY

BACKGROUND OF THE INVENTION

This invention relates generally to invalid devices and, more particularly, is directed to an invalid device of the type having telescoping leg supports for adjusting the height thereof.

Generally, in invalid devices, such as walkers, commodes, bath benches and the like, four vertical leg supports are provided and are interconnected by transverse bracing cross members. The cross members are generally connected to the vertical leg supports by bolts, rivets or the like passing through the respective cross member and vertical leg support at the point of connection therebetween. However, the through holes formed in the support legs to receive such bolts, rivets or the like result in an inherent weakness in the legs so that bending and shearing of the leg at such through holes is more prevalent.

In many cases, the support legs of the invalid device are formed in a telescoping manner, that is, with an outer telescoping member and an inner telescoping member. The outer telescoping member is formed with a plurality of vertically aligned apertures and the inner telescoping member is formed with an outwardly biased push button which engages in one of the vertically aligned apertures for adjusting the lengths of the legs to provide individualized adjustment.

It is important that the cross members interconnecting the support legs should be formed as low as possible to provide the greatest structural support for the invalid device. If the cross members are connected to the leg supports by the aforementioned arrangement, the bolts, rivets or the like will obstruct the inner telescoping member of each leg. As a result, the height adjustment that can be made for the invalid device is limited. To compensate for the above, and to provide a greater adjustability, some manufacturers of invalid devices position the cross members at the upper end of the invalid device, thereby providing, for example, an eleven hole adjustment for the telescoping members of the support legs, as opposed to a mere five hole adjustment for invalid devices by other manufacturers where the cross members are positioned lower along the support legs. However, because the cross members are positioned higher along the support legs, there is greater instability and less structural stability of the invalid device as opposed to those invalid devices where the cross members are positioned at a lower position along the support legs.

In addition, with invalid devices having telescoping support legs, where the cross members are properly positioned at a lower position along the support legs, because there is limited adjustability, the outer telescoping members must generally be made longer. It is therefore required that the packaging and shipping of such invalid devices be relatively bulky and costly.

Further, in such invalid devices, because the extent of adjustment is relatively small, it is required that separate invalid devices be manufactured for children and adults, thereby requiring that the cost of manufacture be increased.

In some cases, in order to eliminate the attachment as discussed above, steel cross members are provided and are secured to steel sleeves surrounding the support legs by welding. However, with this arrangement, the steel cross members and sleeves add weight of approximately one-half pound to the invalid device, which is relatively substantial. Further, the use of bolts, rivets or the like provide greater structural integrity than the steel welds. Thus, although the steel welds do not provide an obstruction to the telescoping support legs, various other disadvantages result therefrom.

OBJECTS AND SUMMARY OF THE INVENTION

Accordingly, it is an object of the present invention to provide an invalid device that overcomes the deficiencies aforementioned.

More particularly, it is an object of the present invention to provide an invalid device by which the cross members are secured to the support legs without obstructing the telescoping operation of the support legs.

It is another object of the present invention to provide an invalid device in which the cross members can be connected to the lower ends of the support legs to provide greater structural stability without obstructing the telescoping operation of the support legs.

It is still another object of the present invention to provide an invalid device which is relatively lightweight.

It is yet another object of the present invention to provide an invalid device having enhanced structural integrity and which is relatively inexpensive to manufacture.

In accordance with an aspect of the present invention, an invalid device includes at least two vertically disposed support legs, each support leg including a pair of inner and outer telescoping leg portions; at least one cross member extending between the at least two vertically disposed support legs; and at least one clamp means for connecting each end of the at least one cross member to the at least two vertically disposed support legs, each clamp means including a first section having a bore extending entirely therethrough for receiving the outer telescoping leg portion of one of the support legs and a slit extending therealong for connecting the exterior of the first section with the bore, two flange members connected along the first section on opposite sides of the slit for receiving at least one cross member, and means for biasing the flange members toward each other so as to fixedly retain the at least one cross member between the flange members and so as to compress the first section about the outer telescoping leg portion of the respective support leg to fixedly retain the latter within the bore.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Figure 1:
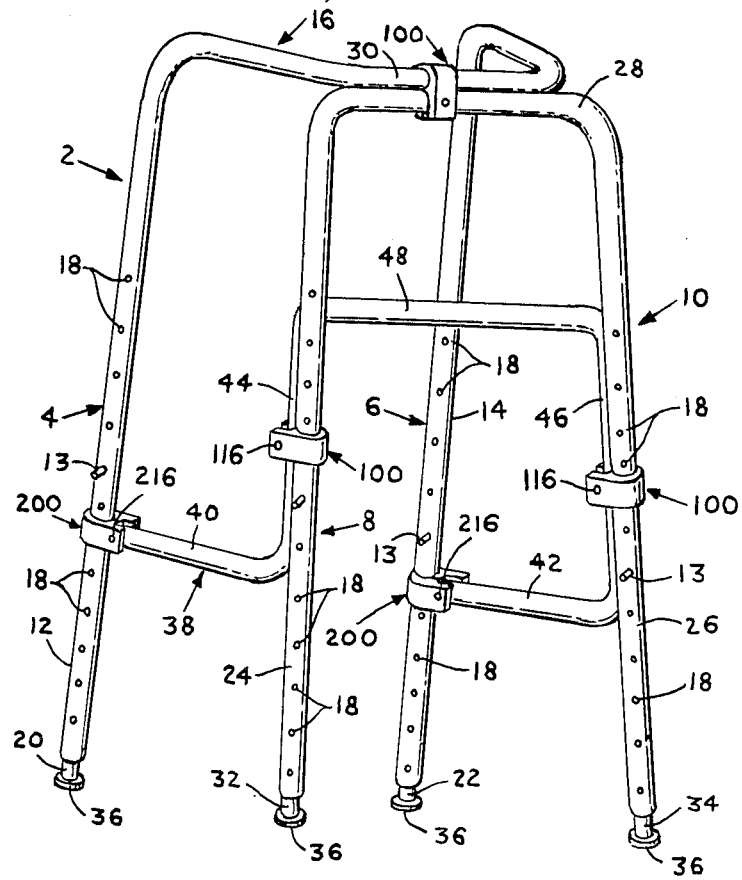
FIG. 1 is a perspective view of a walker according to one embodiment of the present invention.

Referring to the drawings in detail, and initially to FIG. 1 thereof, an invalid walker 2 according to one embodiment of the present invention includes four telescoping support legs 4, 6, 8 and 10 arranged in spaced relation from each other. In particular, rear support legs 4 and 6 are formed with an outer tubular construction comprised of vertically disposed outer telescoping leg portions 12 and 14 spaced from each other, and a U-shaped hand grip support 16 secured at its free ends to the upper ends of outer telescoping leg portions 12 and 14, respectively. During use, the person grips U-shaped support 16.

Each of outer telescoping leg portions 12 and 14 is formed with a plurality of vertically aligned apertures 18, the function of which will be readily apparent hereinafter. The number of such apertures 18 may vary and, as shown in FIG. 1, eleven apertures 18 are vertically aligned on each outer telescoping leg portion 12 and 14.

Inner telescoping leg portions 20 and 22 are telescopically and slidably received in outer telescoping leg portions 12 and 14 and include a spring-biased push button 13 engageable within one of apertures 18 of the respective outer telescoping leg portion to vary the height of rear support legs 4 and 6, as is conventional in the art.

In like manner, front support legs 8 and 10 are comprised of vertically disposed outer telescoping leg portions 24 and 26, respectively, which are connected at their upper ends by a connecting cross member 28. Connecting cross member 28 is further secured to the middle connecting member 30 of U-shaped hand grip support 16, the manner of such connection being described hereinafter in greater detail.

As with rear support legs 4 and 6, outer telescoping leg portions 24 and 26 of front support legs 8 and 10, respectively, each include a plurality of vertically aligned apertures 18 of the same number as provided on rear support legs 4 and 6. Inner telescoping leg portions 32 and 34 are telescopically and slidably received within outer telescoping leg portions 24 and 26, respectively, and, as with rear support legs 4 and 6, each includes a spring-biased push button 13 for engaging with one of apertures 18 in the respective outer telescoping leg portions 24 and 26 so as to adjust the height of vertical support legs 8 and 10.

Further, rubber cups 36 are secured to the lower free ends of inner telescoping leg portions 20, 22, 32 and 34.

Invalid device 2 further includes a cross brace frame 38 for securing rear support legs 4 and 6 to front support legs 8 and 10 so as to provide a unitary, stable structure. Cross brace frame 38 includes transverse cross members 40 and 42 extending from rear legs 4 and 6 to front legs 8 and 10, respectively, whereupon cross members 40 and 42 are bent upwardly so as to extend along front support legs 8 and 10, as at 44 and 46, respectively. The free ends of the latter sections 44 and 46 are interconnected by a cross member 48 extending between front support legs 8 and 10. The free ends of cross members 40 and 42 are secured to rear support legs 4 and 6, respectively, and vertically arranged sections 44 and 46 are connected to front support legs 8 and 10, respectively, in a manner which will be described in greater detail hereinafter.

According to the prior art, the free ends of cross members 40 and 42 extended alongside rear support legs 4 and 6 and a rivet extended through the free end of cross member 40 and rear support leg 4 for securing the two together, and a rivet extended through the free end of cross member 42 and rear support leg 6 for connecting the two together. However, as discussed above, by utilizing such a riveted arrangement, obstructions, that is, the rivets, are interposed in support legs 4 and 6 to provide an obstruction to the sliding movement of inner telescoping leg portions 20 and 22, respectively. As a result, the height adjustment of rear support legs 4 and 6 is greatly restricted.

If cross members 40 and 42 are secured at a higher position along rear legs 4 and 6, invalid device 2 is less structurally stable. In addition, by inserting rivets through rear support legs 4 and 6, a weakening of the legs occurs, thereby permitting easier bending and shearing of the legs. The same holds true for the attachment of vertically arranged sections 44 and 46 to front support legs 8 and 10 by means of rivets.

In accordance with the present invention, a novel clamp arrangement is presented to overcome the aforementioned deficiencies in the prior art.

Referring now to FIGS. 3–6, a clamp 100 for securing vertically arranged sections 44 and 46 to front support legs 8 and 10 will now be described. As shown therein, clamp 100 includes a first section 102 having a bore 104 extending entirely therethrough for receiving outer telescoping leg portion 24 or 26. Bore 104 is open along its length thereof by a slit 106 extending along first section 102 and which connects bore 104 to the exterior of first section 102.

Clamp 100 further includes two flange members 108 and 110 connected along first section 102 on opposite sides of slit 106 for receiving vertically arranged section 44 or 46 therein. It will be appreciated that clamp 100 is particularly adapted to connect two parallel tubular members together and, in this regard, flange members 108 and 110 are curved, as at 111 and 113 to define a semi-circular area for receiving vertically arranged section 44 or 46 in an accurate fitting relation.

Flange members 108 and 110 are further provided with transverse through apertures 112 and 114, respectively, through which a rivet, bolt, set screws or the like 116 are inserted to fixedly retain vertically arranged section 44 or 46 therein. Preferably, vertically arranged sections 44 and 46 include through apertures through which the rivets or the like 116 are inserted. At the same time, it is to be appreciated that insertion of the bolts, rivets, set screws or the like through apertures 112 and 114 pull flange members 108 and 110 toward each other in a tightening manner about vertically arranged section 44 or 46. Such tightening action results in the width of slit 106 decreasing and thereby the diameter of bore 104 also decreasing so that first section 102 tightens about the respective outer telescoping leg portion 24 or 26 to fixedly retain the latter within bore 104. In other words, by pulling flange members 108 and 110 toward each other, clamp 100 fixedly retains vertically arranged section 44 and outer telescoping leg portion 24 therein, and does the same with respect to vertically arranged section 46 and outer telescoping leg portion 26.

Clamp 100 can also be used in a similar manner with respect to connecting members 28 and 30, although the use of clamp 100 with such members is not so imperative as with the support legs.

Figure 3:
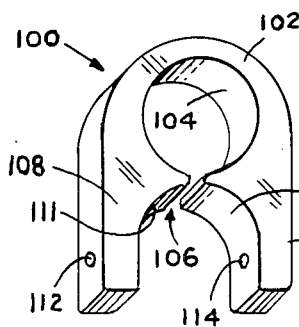
FIG. 3 is a perspective view of a clamp that can be used with the invalid device according to the present invention.
Figures 4, 5:
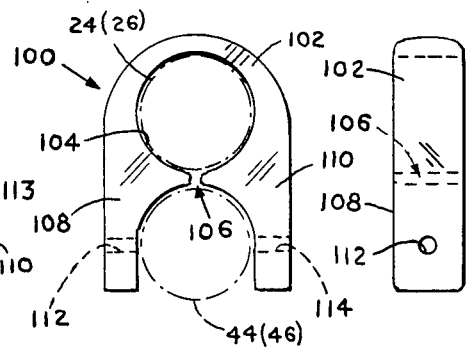
FIG. 4 is a top plan view of the clamp of FIG. 3.
FIG. 5 is a side elevational view of the clamp of FIG. 3.
Figure 6:
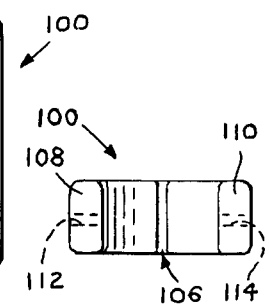
FIG. 6 is a front elevational view of the clamp of FIG. 3.
Figure 7:
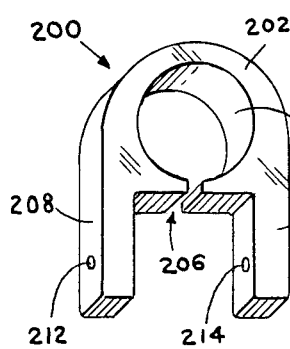
FIG. 7 is a perspective view of a second embodiment of a clamp that can be used with the invalid device according to the present invention.
Figures 8, 9:
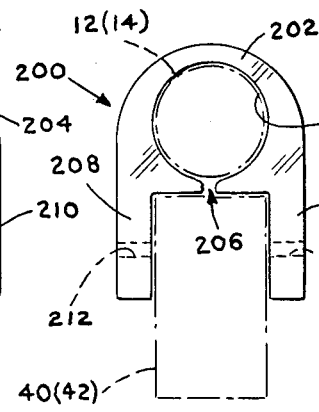
FIG. 8 is a top plan view of the clamp of FIG. 7.
FIG. 9 is a side elevational view of the clamp of FIG. 7.

Referring now to FIGS. 7–9, a clamp 200 according to the present invention for use in connecting cross members 40 and 42 to rear support legs 4 and 6, respectively, will now be described, in which elements corresponding to those in clamp 100 of FIG. 3 are identified with the same numerals but preceded by a "200" prefix, rather than a "100" prefix. As shown therein, clamp 200 includes a first section 202 having a bore 204 for receiving outertubular leg portion 12 or 14 therein in a similar manner to bore 104 of FIGS. 3–6. In like manner, a slit 206 extends along first section 202 for connecting the exterior thereof with bore 204. Two flange members 208 and 210 are connected along first section 202 on opposite sides of slit 206 for receiving cross member 40 or 42. Because cross members 40 and 42 are connected substantially perpendicular to outer telescoping leg portions 12 and 14, respectively, the inner directing faces of flange members 208 and 210 form a rectangular, rather than semi-circular, cross-sectional configuration, with first section 202. As with clamp 100, flange members 208 and 210 are provided with through apertures 212 and 214, respectively, through which a bolt, rivet, set screws or the like may be disposed for tightening flange members 208 and 210 about the respective cross member 40 or 42. With clamp 200, outer tubular leg portion 12 or 14 is inserted through bore 204 of clamp 200, and the respective cross member 40 or 42 has its free end inserted into the rectangular section defined by flange members 208 and 210, as shown in FIG. 8. Thereupon, a bolt, rivet, set screws or the like 216 are inserted through apertures 212 and 214 and through a corresponding through aperture at the free end of cross member 40 or 42, if any, and tightened so as to bias flange members 208 and 210 toward each other. As a result, cross member 40 or 42 is fixedly retained between flange members 208 and 210 of the respective clamp 200, and first section 202 of the respective clamp 200 is tightened about the respective outer telescoping leg portion 12 and 14 to retain the latter within bore 204.

By use of clamps 100 and 200, no bolts, rivets or the like extend through support legs 4, 6, 8 or 10 so that the strength of such support legs is not reduced. Further, because no bolts, rivets or the like extend through the support legs, there is no obstruction to the telescoping movement of inner telescoping leg portions 20, 22, 32 and 34 so that a greater height adjustment can be attained. Because a greater height adjustment can be attained, outer telescoping leg portions 12, 14, 24 and 26 can be made shorter, thereby also reducing the packaging and shipping costs for the invalid device. Further, because the outer telescoping leg portions can be made smaller, a single unit can be made for children and adults, thereby reducing manufacturing costs. Lastly, because there is no obstruction to the telescoping support legs, the cross braces can be provided at a lower portion of the invalid device to provide greater stability and safety therefor.

Figure 2:
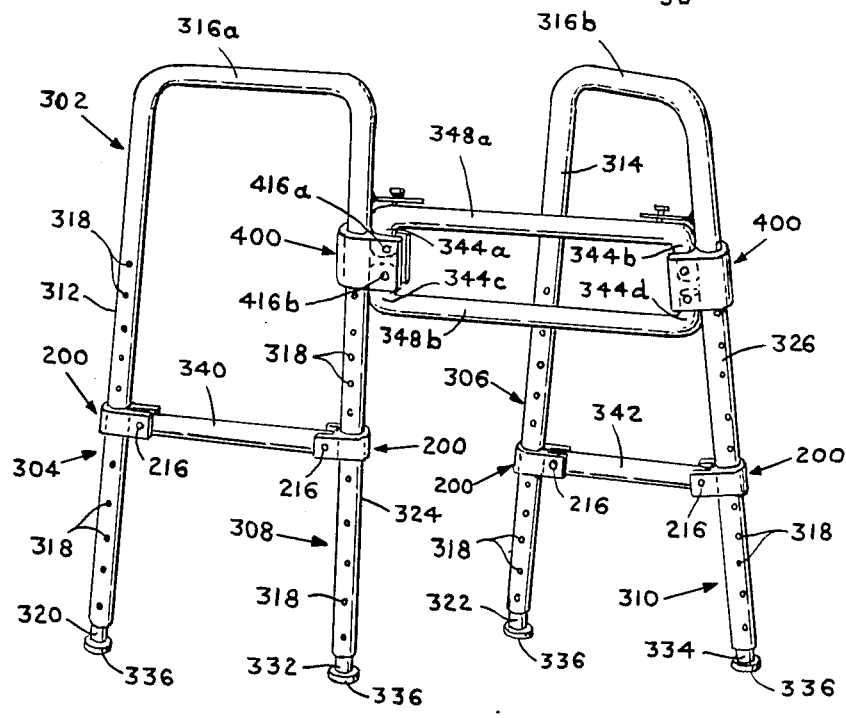
FIG. 2 is a perspective view of a folding walker according to a second embodiment of the present invention.

Referring now to FIG. 2, an invalid device 312 in the form of a folding walker according to a second embodiment of the present invention includes rear support legs 304 and 306 and front support legs 308 and 310. Rear support legs are formed of vertically disposed outer telescoping leg portions 312 and 314, and front support legs 308 and 310 are formed of outer telescoping leg portions 324 and 326, respectively. In the invalid device of FIG. 2, outer telescoping leg portions 312 and 324 are connected together at their upper ends by a hand grip member 316a and, in like manner, outer telescoping leg portions 314 and 326 are connected at their upper ends by a hand grip member 316b.

As with invalid device 2 of FIG. 1, outer telescoping leg portions 312, 314, 324 and 326 are each formed with a plurality of vertically aligned apertures 318. Inner telescoping leg portions 320, 322, 332 and 334 are telescopically and slidably received within outer telescoping leg portions 312, 314, 324 and 326, respectively, and have respective spring-biased push buttons (not shown) for engaging within an aperture 318 of the respective outer telescoping leg portion for adjusting the height of invalid walker 302. Rubber cups 336 are also provided at the free ends of inner telescoping leg portions 320, 322, 332 and 334.

To provide additional safety and stability, cross members 340 and 342 are provided for connecting the lower ends of outer telescoping leg portions 312 and 324 and outer telescoping leg portions 314 and 326, respectively. The free ends of cross members 340 and 342 are connected to their respective outer telescoping leg portions by clamps 200 in the same manner as taught with invalid walker 2 of FIG. 1.

In accordance with the invalid walker 302 of FIG. 2, transverse cross members 348a and 348b are provided for interconnecting front outer telescoping leg portions 324 and 326. Transverse cross member 348a is formed at its free ends thereof with downturned right angle bent ends 344a and 344b which are positioned parallel and adjacent to outer telescoping leg portions 324 and 326, respectively. In like manner, transverse cross member 348b is formed with upturned right angle bent ends 344c and 344d at the free ends thereof which lie parallel and adjacent to outer telescoping leg portions 324 and 326 in facing relation and in close proximity to bent ends 344a and 344b, respectively.

Figure 10:
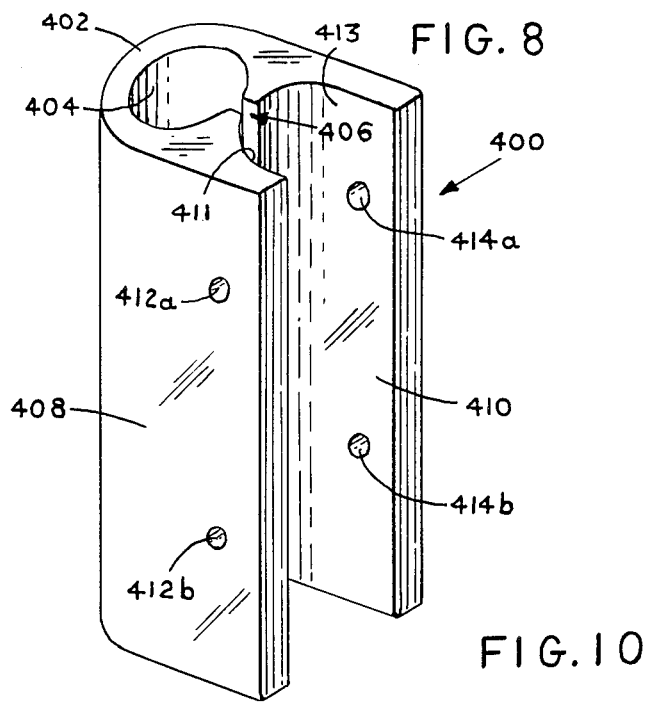
FIG. 10 is a perspective view of a third embodiment of a clamp that can be used with the invalid device according to the present invention.

Referring now to FIG. 10, a third clamp 400 according to the present invention for connecting bent ends 344a and 344c to outer tubular leg portion 324, and for connecting bent ends 344b and 344d to outer tubular leg portion 326, will now be described. As shown in FIG. 10, clamp 400 is formed in an identical manner to clamp 100 but has a height which is much greater. Because of the extra height of clamp 400, flange member 408 thereof is formed with two vertically aligned, spaced through apertures 412a and 412b and, in like manner, flange member 410 is formed with two vertically aligned, spaced apertures 414a and 414b.

In this regard, as shown in FIG. 2, outer telescoping leg portion 324 is positioned within bore 404 and bent end 344a is positioned between flanges 408 and 410 such that a rivet 416a or the like secures bent end 344a between flange members 408 and 410 at the upper ends thereof, and a rivet 416b extending through apertures 412b and 414b fixedly retains bent end 344c between flange members 408 and 410 at the lower ends thereof.

Upon tightening of such rivets so as to bias the flange members 408 and 410 toward each other, outer telescoping leg portion 324 is fixedly retained within bore 404. The securing of bent end portions 344b and 344d to outer telescoping leg portion 326 is performed in a similar manner with another clamp 400.

It is to be appreciated that various modifications can be made to the present invention within the scope of the Claims herein. For example, the present invention is not limited to the invalid walkers shown in FIGS. 1 and 2. The present invention can be used with other invalid devices, such as an adjustable commode in which cross members criss-cross to connect the outer telescoping leg portion of one front leg to the outer telescoping leg portion of the opposite rear leg, and the outer telescoping leg portion of the other front leg is connected to the outer telescoping leg portion of the other rear leg, by use of clamps 200. Further, clamp 200 may also have its height increased and be formed in a similar manner to clamp 400 of FIG. 10.

Having described specific preferred embodiments of the invention with reference to the accompanying drawings, it is to be understood that the present invention is not limited to those precise embodiments, and that various changes and modifications may be effected therein by one of ordinary skill in the art without departing from the spirit and scope of the invention as defined by the appended Claims.

What is claimed is:

1. An A-shaped clamp for claimping together a first bar and a second bar, comprising:
    a substantially U-shaped portion;
    first and second spaced-apart legs having first ends extending from said U-shaped portion at first and second junctions, said legs including opposing apertures for receiving a tightening member;
    a cross bar having opposite ends extending from said clamp at positions adjacent said juctions, said cross bar disposed substantially transverse to said legs, said cross bar having a section thereof cut-away to define a gap therein, said cross bar having a substantially uniform depth throughout its length;
    a first bar receiving section defined between said U-shaped portion and said cross bar, for receiving said first bar, such that said cross bar wraps about said first bar when said clamp is tightened by said tightening member; and
    a second bar receiving section defined between said legs and said cross bar for receiving said second bar, with said cross bar preventing substantial contact and substantial deformation of either of said first or second bars by the other of said first and second bars.

2. An A-shaped clamp according to claim 1; wherein said substantially U-shaped portion has an inner surface with a circular configuration.

3. An A-shaped clamp according to claim 2; wherein said cross bar has a first surface facing said substantially U-shaped portion, said first surface having an arcuate configuration, such that said inner surface of said substantially U-shaped portion and said first surface of said cross bar define said first bar receiving section as a substantially circular aperture.

4. An A-shaped clamp according to claim 3; wherein said cross bar has a second surface facing opposite to said first surface, said second surface having a linear configuration such that said second surface and said legs define said second bar receiving section as an open-ended, substantially rectangular configuration.

5. An A-shaped clamp according to claim 3; wherein said cross bar has a second surface opposite to said first surface, said second surface having an arcuate configuartion.

6. An A-shaped clamp according to claim 1; wherein said gap is substantially centrally positioned in said cross bar to form two spaced apart cross bar sections.

7. An A-shaped clamp according to claim 1; wherein said first and second legs are substantially parallel to each other.

8. An A-shaped clamp according to claim 1; wherein said tightening member is one of a bolt, rivet and set screw.

9. A device for supporting invalids, comprising:
    four vertically disposed support legs, each support leg including a pair of inner and outer telescoping leg portions;
    at least one cross member, each interconnecting at least two vertically disposed support legs;
    a plurality of A-shaped clamps, each connecting an outer telescoping leg portion of each support leg to said at least one cross member, each A-shaped clamp including
    a substantially U-shaped portion;
    first and second spaced-apart legs having first ends extending from said U-shaped portion at first and second junctions, said first and second legs including opposing apertures for receiving a tightening member;
    a cross bar having opposite ends extending from said clamp at positions adjacent said junctions, said cross bar disposed substantially transverse to said first and second legs, said cross bar having a section thereof cut-away to define a gap therein, said cross bar having a substantially uniform depth throughout its length;
    a first bar receiving section defined between said U-shaped portion and said cross bar, for receiving an outer telescoping leg portion, such that said cross bar wraps about said respective outer telescoping leg portion when said clamp is tightened by said tightening member; and
    a second bar receiving section defined between said first and second legs and said cross bar for receiving a cross member, with said cross bar preventing substantial contact and substantial deformation of either of said respective cross member and outer telescoping leg portion by the other of said respective cross member and outer telescoping leg portion.

10. A device according to claim 9; wherein said substantially U-shaped portion of each A-shaped clamp has an inner surface with a circular configuration.

11. A device according to claim 10; wherein said cross bar of each A-shaped clamp has a first surface facing said substantially U-shaped portion, said first surface having an arcuate configuration, such that said inner surface of said substantially U-shaped portion and said first surface of said cross bar of each A-shaped clamp define said first bar receiving section as a substantially circular aperture.

12. A device according to claim 11; wherein said cross bar of each A-shaped clamp has a second surface facing opposite to said first surface, said second surface having a linear configuration such that said second surface and said legs of each A-shaped clamp define said second bar receiving section as an open-ended, substantially rectangular configuration.

13. A device according to claim 11; wherein said cross bar of each A-shaped clamp has a second surface facing opposite to said first surface, said second surface having an arcuate configuration.

14. A device according to claim 9; wherein said gap is substantially centrally positioned in said cross bar of each A-shaped clamp to form two spaced apart cross bar sections.

15. A device according to claim 9; wherein said first and second legs of each A-shaped clamp are substantially parallel to each other.

16. A device according to claim 9; wherein said tightening member is one of a bolt, rivet and set screw.

* * * * *